United States Patent [19]
Binnings et al.

[11] 3,738,730
[45] June 12, 1973

[54] MICROSCOPE ATTACHMENT

[75] Inventors: Gerald F. Binnings, Arcadia; Theodore N. Meyer, Westminster; Mel J. Riley, Covina, all of Calif.

[73] Assignee: Aerojet-General Corporation, El Monte, Calif.

[22] Filed: July 6, 1971

[21] Appl. No.: 160,050

Related U.S. Application Data

[63] Continuation of Ser. No. 858,992, Sept. 18, 1969, abandoned.

[52] U.S. Cl. ................................. 350/90, 40/78.03
[51] Int. Cl. ............................................ G02b 21/26
[58] Field of Search ................. 350/86-90, 92-95; 40/78.03; 353/112-114

[56] References Cited
UNITED STATES PATENTS

| | | | |
|---|---|---|---|
| 2,513,102 | 6/1950 | Parlini et al. | 40/78.03 |
| 2,634,653 | 4/1953 | Barth | 40/78.03 |
| 2,858,628 | 11/1958 | Rideout | 40/78.03 |
| 3,620,596 | 11/1971 | Binnings | 350/95 |
| 2,604,008 | 7/1952 | Beekley | 353/112 |
| 2,645,869 | 7/1953 | Cook | 350/90 UX |
| 2,849,814 | 9/1958 | Rideout | 40/78.03 |
| 3,202,049 | 8/1965 | Bond | 350/179 X |

Primary Examiner—David H. Rubin
Attorney—Edward O. Ansell, Arthur Decker and D. Gordon Angus

[57] ABSTRACT

Disclosed herein is an assembly for cooperating with the viewing stage of microscope, which assembly provides a supply bin for a plurality of laboratory slides and sequential positioning thereof in approximate focus between the objective and substage lenses of the microscope. Included are spring biasing means arranged to hold the specimen-carrying surface of a slide in the reference focal plane and an integral feed for injecting optical fluid between the substage lens and the specimen.

4 Claims, 4 Drawing Figures

INVENTORS,
GERALD F. BINNINGS
THEODORE N. MEYER
MEL J. RILEY
BY Arthur Becker
Edward O. Ansell
ATTORNEYS

INVENTORS,
GERALD F. BINNINGS
THEODORE N. MEYER
MEL J. RILEY

BY Arthur Decker
Edward O. Ansell
ATTORNEYS

MICROSCOPE ATTACHMENT

This application is a continuation of Ser. No. 858,992, filed Sept. 18, 1969, now abandoned.

BACKGROUND OF THE INVENTION

The reading of slides ordinarily consumes a large part of the time of skilled laboratory technicians. It generally involves the basic steps of preparing the slides with the specimen to be examined and placing a cover slip over the specimen to be examined and placing a cover slip over the specimen to protect it; the slide is then manually placed on the stage of the microscope and, by turning a thumb wheel, the microscope lens system is focussed. The slide is then examined and manually removed from the stage.

One type of microscope used in studies of fluorescent specimens is the dark field microscope; this employs a substage lens through which the specimen is illuminated with ultra violet light, causing the fluorescent material in the specimen to become visible, the remainder background normally appearing dark. In such microscopy, the problem of slide reading is especially severe since, for optium viewing, the upper and substage optical systems both must be focussed on the plane of the specimen. Since, quite often, the analysis of the slide is a function of the fluorescent intensity, which varies with the focus of the substage assembly, proper focus is essential for proper reading, and this is especially difficult since the standard glass laboratory slides are usually inconsistent in thickness; at any rate, prefocusing of the substage for more than one slide generally cannot be accomplished.

In this invention, a single reference plane, namely, the bottom surface of a thin glass slide positioned against reference stops associated with the substage, is used to facilitate prefocusing of the substage reading of slides. The invention also makes the region between the substage objective and the specimen readily accessible for the injection of optical fluid.

BRIEF SUMMARY OF THE INVENTION

This invention comprises an improved microscope slide handling apparatus which transports, focuses, and discharges, in an inverted (i.e., specimen-down) position, laboratory slides such as that described in the patent application Ser. No. 732,341 filed May 27, 1968 now U.S. Pat. No. 3,620,596. It includes provision for injection of optical fluid into the specimen area, spring hold-down retainers for the slide, and a magazine and magazine holder in a slide feed assembly, for advancing the slides in sequence to the viewing position without manually handling them.

DESCRIPTION OF THE PREFERRED EMBODIMENT

Figure 1:
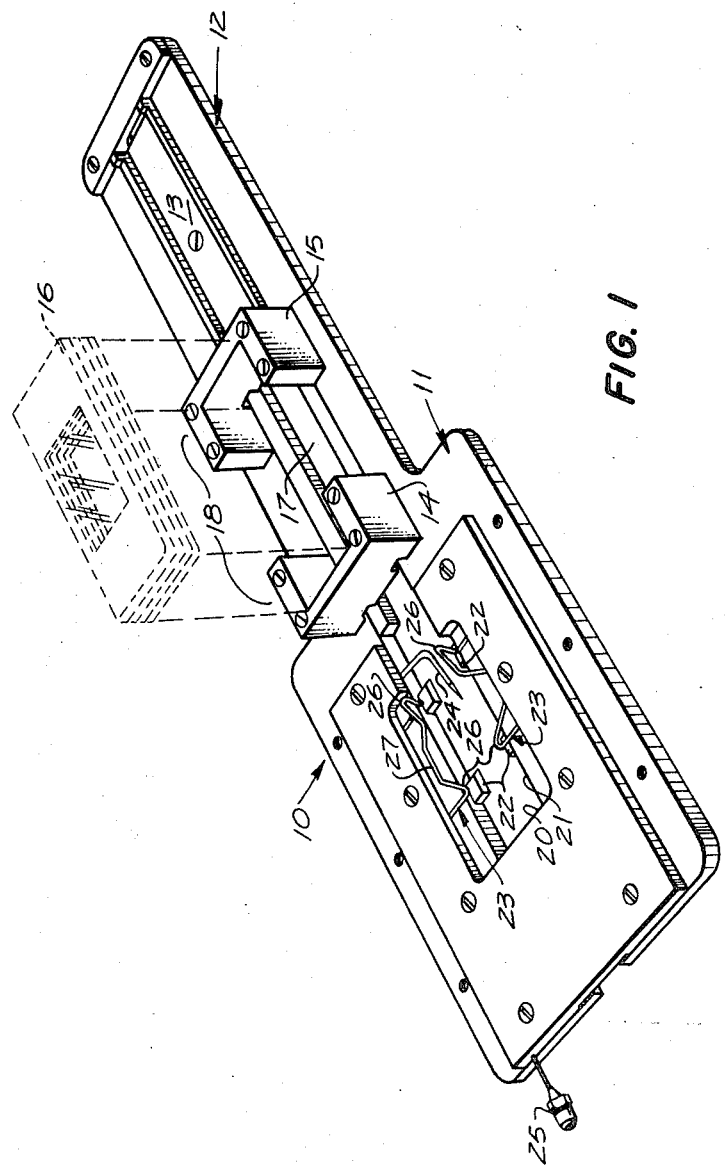
FIG. 1 is an isometric view of the microscope attachment of this invention.

In FIG. 1, the present microscope attachment is seen as including frame 10 having rectangular portion 11 configured similarly to a microscope stage and extension 12. On extension 12 is mounted slide feed 13 and U-shaped retainers 14 and 15 which latter together comprise magazine 18. Shown in phantom above retainers 14 and 15 are a number of laboratory slides 16 such as previously referenced.

Feed 13 is positioned in longitudinal slot 17 in extension 12 wherein it may slide from right to left in the figure so as to eject the bottom slide in magazine 18 and move it into viewing opening 20. Opening 20 is defined by walls 21 from which project four pads 22 on which the slides rest when being examined. Extending into opening 20 are hold-down springs 23 and the end of hollow tube 24. Optical fluid may be supplied through fitting 25 which is attached to tube 24 at the left end of frame 10. The lateral dimension of opening 20 (between walls 21) is only slightly greater than the width of the slides to be handled; consequently, when slides are ejected into opening 20, they are repeatedly in proper lateral position.

Figure 2:
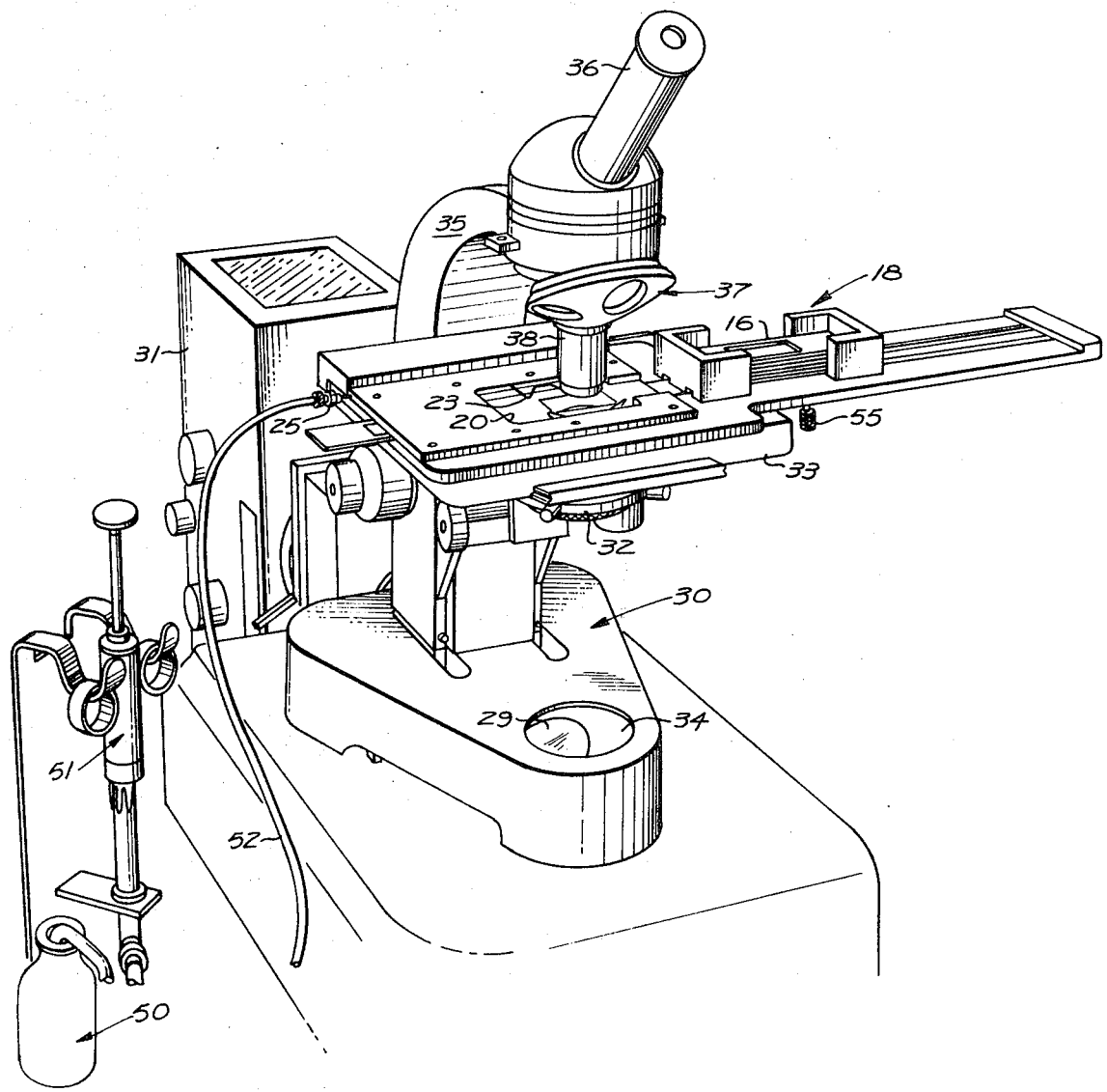
FIG. 2 is a perspective showing a laboratory microscope with the attachment of FIG. 1 mounted on its stage and including the supply system for immersion fluid.

The environment in which the microscope attachment of this invention is used and its mode of operation are represented in FIG. 2, which shows dark field microscope 30 and its dual light source 31, including an incandescent lamp for normal viewing and an ultra violet lamp for fluorescent viewing (both not shown). The light from the lamps is coupled to lens system 32 below stage 33 via mirror 29 and opening 34. Arm 35, eyepiece 36, turret 37 and objective lens system 38 of microscope 30 are conventional, as are its focusing and stage centering adjustments. A turret microscope is preferred for use with the invention even though only a single objective lens 38 may be required, in order that lens 38 may be rotated easily out of the way of the slides while they are being positioned in opening 20.

The optical fluid for use in viewing is applied for the present microscope attachment through fitting 25 from reservoir 50 and tubing 52 as forced by pump 51. Fluid is shown for convenience as supplied from a separate assembly but, of course, it can be built integral with the microscope and may be actuated automatically with each slide replacement.

Slides 16 are advanced by the operator who turns aside turret 37 in order to move objective lens 38 out of the way and, using knob 55, provides side-to-side movement of feed 13 (FIG. 1), thereby extracting the bottom slide of the stack in magazine 18 and moving it into opening 20. In opening 20, the slide is held down against pads 22 (FIG. 1) by springs 23 and the slide previously viewed is partially ejected from the left side of the attachment. (Normally, a container for ejected slides may be attached to the base of microscope 30; for clarity, this has not been shown in FIG. 2). The operator then returns lens 38 to viewing position and may actuate pump 51 to inject a quantity of fluid 86 between the slide and lens system 32 so as to provide fluid coupling therebetween; he is now ready to focus and view and will find that only a slight adjustment of the focussing controls of microscope 30 is involved.

Figure 3:
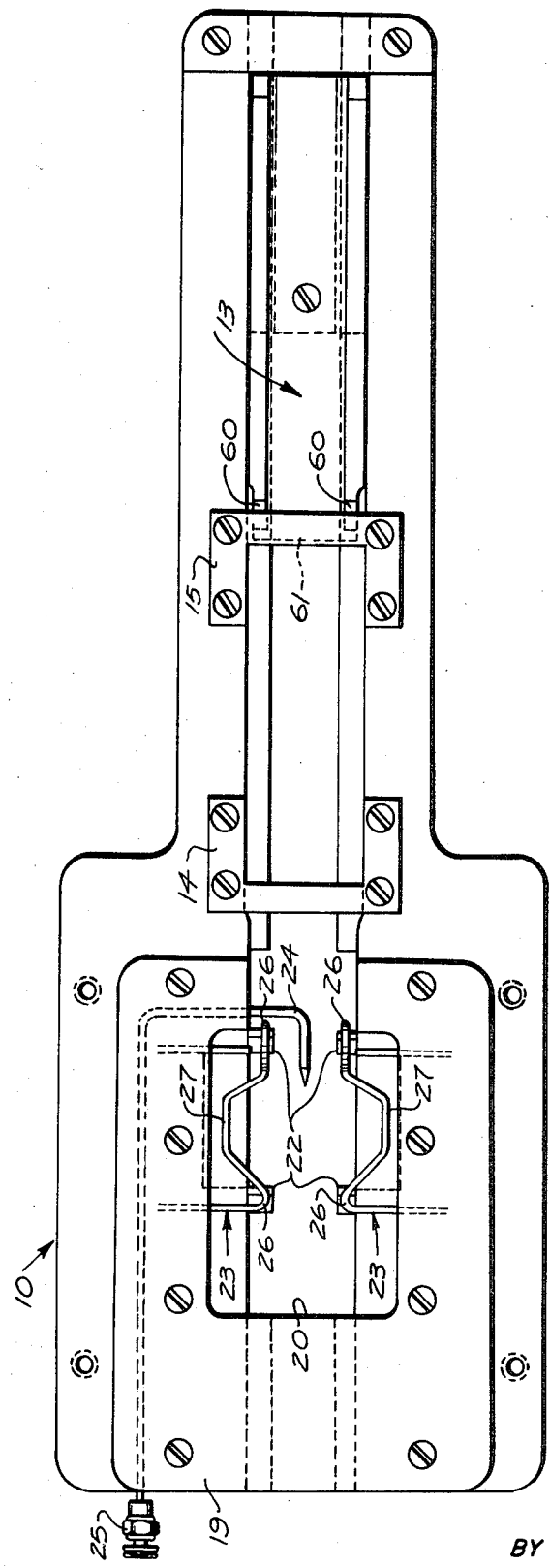
FIG. 3 is a plan view of the microscope attachment of FIG. 1.

FIG. 3 shows various significant details of the present microscope attachment.

Feed 13 comprises ramp 60, which lifts the next-to-bottom slide and push face 61, which selects the bottom slide and advances it to opening 20. Hold-down springs 23 includes bends 26, which extend over pads 22 so pressure by the latter is applied to the slide directly at its underside (the reference plane) only, and bends 27 which extend out of the area where objective lens 38 is positioned.

Also shown is the path of tube 24 through a recess in cover 19 of the attachment.

Figure 4:
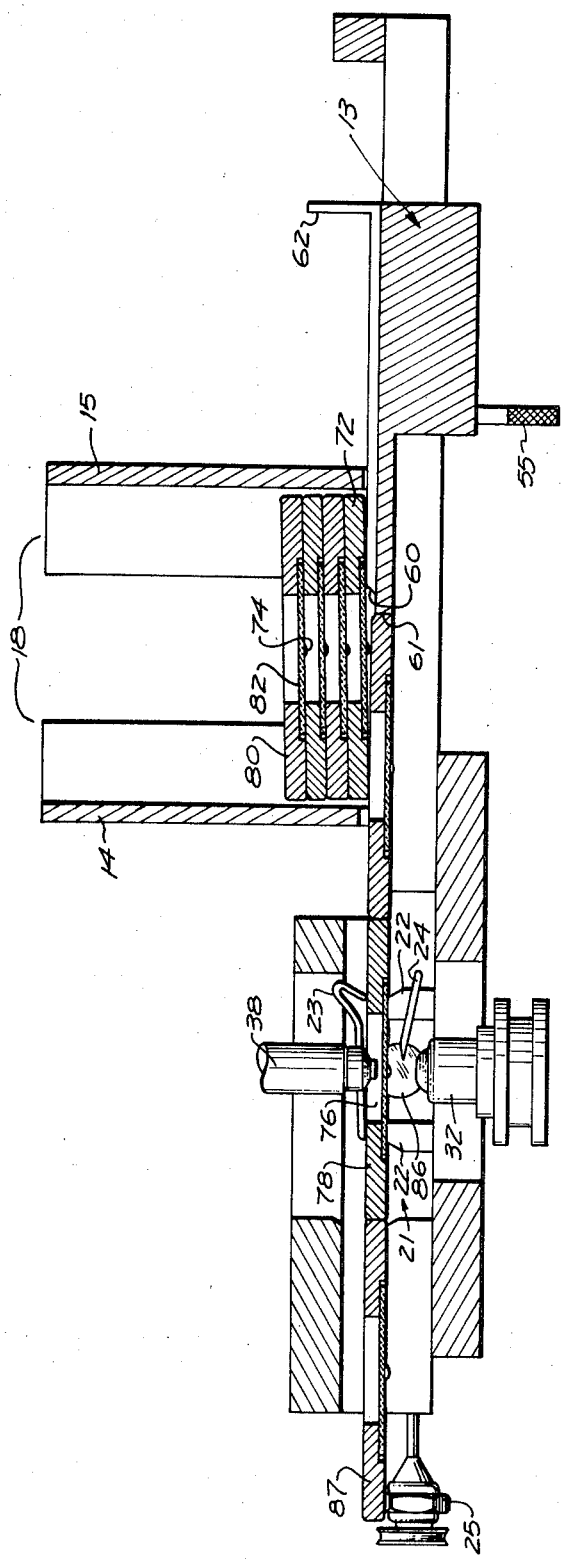
FIG. 4 is a longitudinal section of the microscope attachment of FIG. 1 mounted on a microscope stage.

In the section shown in FIG. 4, push face 61 and ramp 60 of feed 13 advance the bottom slide 70 from magazine 18 while lifting slide 72 so that specimen 74 on the bottom of slide 72 is not contacted as slide 70 is advanced. It should be noted that the preferred slides for use with the attachment includes a frame 80 having a central opening in which is contained thin glass slip cover 82 for supporting the specimens. This type of slide structure is preferred to the standard slide because it provides less focussing thickness as shown, since lens system 38 may extend into upper surface area 76 of slide 78. It is also clear that slide 78 is held down by the springs 23 against pads 22 thereby referencing the underside of cover 82 for focussing, since slide 78 has already been positioned laterally by contact against walls 21 and longitudinally by face 61 of feed 13 when surface 62 contacted retainer 15. Thus, the substage lens system 32 may be prefocused. The end of tube 24 extends into the interstice between slide 78 and lens system 32 and a bubble 86 of optical fluid may be inserted to couple to the specimen, thereby eliminating air interfaces between lens and specimen which otherwise might result in refraction and distortion.

Slide 87 has already been read and is shown partially ejected from the left side of the attachment.

What is claimed is:

1. A microscope attachment comprising:

a frame secured to the stage of a microscope, said frame having an opening therein aligned with the microscope optics, the lateral dimensions of said opening being only slightly greater than the width of the microscope slide to be viewed therein;

a slide magazine attached to the upper side of said frame in spaced relationship to said opening;

a vertical stack of microscope slides disposed in said magazine, each microscope slide comprising a centrally apertured frame containing a thin transparent slip substantially flush with the underside of the apertured frame, said slip supporting a specimen on its underside;

an open track in said frame for guiding the advance of said microscope slides into said opening from the bottom of said magazine;

a slidable feed member in said track to push microscope slides from said magazine into said opening and also out of said opening when more than one slide is in said track, said feed member having a front edge to push the lowermost microscope slide from said magazine and a ramp to raise the remaining stack of microscope slides in said magazine to prevent contact of the specimen area with the slide being pushed;

said feed member engaging stop means at the end of its feed stroke to align the specimen area of the microscope slide being viewed with the microscope;

support means extending inwardly into said opening in said frame to directly engage the specimen side of said microscope slides; and spring means engaging the opposite side of said microscope slide to bias the slide against said support means for accurate focus positioning of said specimen with respect to the optics of said microscope.

2. A microscope attachment in accordance with claim 1 having means associated with said frame opening for introducing optical fluid at the specimen surface of the slide to provide fluid coupling between the specimen and the microscope optics.

3. A microscope attachment in accordance with claim 2 having a hand-actuated pump for delivery of optical fluid to form the optical coupling.

4. A microscope attachment in accordance with claim 1 wherein said fluid means contains a channel portion in said frame and an outlet portion projecting into said opening.

* * * * *